(12) United States Patent
DeMarco et al.

(10) Patent No.: US 7,660,657 B2
(45) Date of Patent: Feb. 9, 2010

(54) ANTI-HUNT SYSTEM AND METHOD FOR PARALLEL PATH VARIABLE TRANSMISSION

(75) Inventors: Frank A DeMarco, East Peoria, IL (US); Brian D Kuras, Metamora, IL (US); Alberto Martinez, Jr., Lisle, IL (US)

(73) Assignee: Caterpillar Inc., Peoria, IL (US)

( * ) Notice: Subject to any disclaimer, the term of this patent is extended or adjusted under 35 U.S.C. 154(b) by 184 days.

(21) Appl. No.: 11/772,109

(22) Filed: Jun. 29, 2007

(65) Prior Publication Data

US 2009/0005941 A1    Jan. 1, 2009

(51) Int. Cl.
G06F 7/00 (2006.01)
(52) U.S. Cl. ................. 701/51; 701/54; 701/61
(58) Field of Classification Search ............. 701/51, 701/54, 61
See application file for complete search history.

(56) References Cited

U.S. PATENT DOCUMENTS

| | | | |
|---|---|---|---|
| 5,669,850 A | 9/1997 | Dourraet et al. | |
| 5,738,605 A | 4/1998 | Fliearman | |
| 5,938,711 A | 8/1999 | Steeby et al. | |
| 6,123,644 A | 9/2000 | Janecke et al. | |
| 6,343,250 B1 | 1/2002 | Kuras et al. | |
| 6,385,970 B1 | 5/2002 | Kuras et al. | |
| 6,393,945 B1 | 5/2002 | Kuras | |
| 6,409,628 B1 | 6/2002 | Kuras | |
| 6,424,902 B1 | 7/2002 | Kuras | |
| 7,011,602 B2 * | 3/2006 | Makiyama et al. | ............ 477/44 |
| 2003/0064855 A1 * | 4/2003 | Tanaka et al. | ............... 477/115 |

* cited by examiner

Primary Examiner—Mark Hellner
(74) Attorney, Agent, or Firm—Leydig, Voit & Mayer, Ltd.; Jandá M. Carter (57) ABSTRACT

A system and method for largely controlling transmission gear ratio oscillation is disclosed. When shifts are executed substantially at synchronous points rendering hysteretic anti-hunting schemes impractical, the disclosed techniques in any combination thereof may allow for oscillation control via an overridable lock-out timer. For oscillation control during incline navigation and other similar loading scenarios, the transmission may be selectively locked if certain operational criteria are met.

20 Claims, 7 Drawing Sheets

ANTI-HUNT SYSTEM AND METHOD FOR PARALLEL PATH VARIABLE TRANSMISSION

TECHNICAL FIELD

This patent disclosure relates generally to hydrostatic torque controlling transmissions, and, more particularly to an anti-hunt system and method to control gear train oscillation in a parallel path variable transmission.

BACKGROUND

Because of the relationship between torque and RPM in many rotational power sources such as motors, engines, turbines, etc., different usable gear ratios are provided by drive trains connecting such power sources to a useful load to propel a machine, drive an implement or conduct other work. The drive train relies on the relationship between output torque and angular speed (in revolutions per minute "RPM") to operate at a given gear ratio. Typically, the speed of the power source and/or the load determines the appropriate gear ratio for driving the load. In many systems, a drive train or transmission controller executes this selection automatically without operator intervention.

The automatic selection of gears ratios, while often convenient from an operator standpoint, can lead to gear train oscillations. Such oscillations occur when conditions immediately after a shift indicate that the immediately prior gear ratio should be selected instead. For example, consider a system wherein engine speed is used to determine an appropriate shift point between two gear ratios. When the shift point is reached during acceleration, i.e., increasing engine speed, the shift to a higher gear ratio will cause the engine speed to decrease to a speed lower than the shift point. This in turn, will cause the controller to execute a shift back to the lower gear. However, now the engine will unload and the engine speed will increase past the shift point, causing the controller to execute a shift back to the higher gear.

Such oscillation can be inefficient and annoying, and may decrease the useful life of the drive train and the engine between rebuilds. Accordingly, certain remedial measures have developed in the art to address the issue of gear train oscillation in speed-controlled transmissions. Typically, the transmission controller implements a hysteresis algorithm whereby the shift point between gears is bifurcated into an up-shift point and a down-shift point, with the up-shift point being at a higher engine speed than the down-shift point. In this way, if the engine bogs down slightly after an up-shift, there will not be an immediate down-shift unless the engine loads to such an extent that the lower down-shift point is passed. Similarly, when the engine unloads after a down-shift, there will not be an immediate up-shift unless the engine unloads to such an extent that the higher up-shift point is passed.

The use of hysteresis shift algorithms, however, is not effective for controlling oscillations in parallel path variable transmissions. In these transmissions, a variable direction hydrostatic element drives the gear train such as in certain split torque transmissions. One example of a hydrostatic transmission consisting of a variable speed hydraulic pump and a hydraulic motor is disclosed in U.S. Pat. Nos. 6,385,970 and 6,424,902 to Kuras et al.

In such a transmission, shift points result in a reversal in the direction of the variator acceleration. Thus, the shift points are necessarily defined such that the down-shift and up-shift points between any two ratios are singular, i.e. they both lie at essentially the same RPM (or transmission ratio). This is in contrast to other transmission types as discussed above wherein a shift may properly occur over a broader range of power source speeds. Thus, the anti-hunt hysteresis algorithm employed in many transmission types is generally impractical in parallel path variable transmissions.

The foregoing background discussion is intended solely to aid the reader. It is not intended to be limiting, and thus should not be taken to indicate that any particular element of a prior system is unsuitable for use, nor is it intended to indicate any element, including solving the motivating problem, to be essential in implementing the innovations described herein. The implementations and application of the innovations described herein are defined by the appended claims.

BRIEF SUMMARY OF THE DISCLOSURE

In one aspect, a method for controlling a split torque transmission having a variator input and a transmission output at least partially avoids drive train oscillation conditions. The split torque transmission has a plurality of contiguous selectable operating ranges, with adjacent operating ranges being separated by synchronous points. In a further aspect, the method comprises operating the transmission in a first operating range and detecting that an output ratio of the transmission has reached a first synchronous point between the current operating range and a second operating range. The method then causes the transmission to shift from the first operating range to the second operating range substantially at the synchronous point, and sets a lock-out timer to prevent a subsequent shift of the transmission until the timer has expired. The method also determines whether the output ratio trends back toward the first synchronous point after setting the lock-out timer. If so, the method overrides the lock-out timer to allow a shift prior to expiration of the timer if such a trend occurs and the output ratio has passed a predetermined threshold value.

DETAILED DESCRIPTION

This disclosure relates to a system and method for controlling transmission gear ratio oscillations due to repetitive and/or unnecessary sequential up-shifts and down-shifts, also known as "hunting." It is especially useful in systems where the use of a hysteretic shift algorithm is impractical or undesirable, such as in a parallel path variable transmission. In these transmissions, it is desirable to execute shifts at synchronous points rather than over a broader range of operating conditions. For this reason, simple hysteretic anti-hunting schemes are largely impractical.

This disclosure describes a system for controlling hunting in parallel path variable transmissions or the like using a combination of one or more techniques that provide oscillation control without relying on a hysteresis limit. For example, after a shift from a first operating range to a second operating range at the synchronous point, a controller sets a lock-out timer to prevent a subsequent shift of the transmission until the timer has expired. The system also provides mechanisms for overriding the timer lock-out when necessary. For example, when, after a shift, the output ratio trends steadily back toward the prior synchronous point and the output ratio has passed a threshold value, the controller may override the lock-out timer and allow a shift prior to expiration of the timer. Additional and alternative aspects will become apparent from consideration of the following.

Figure 1:
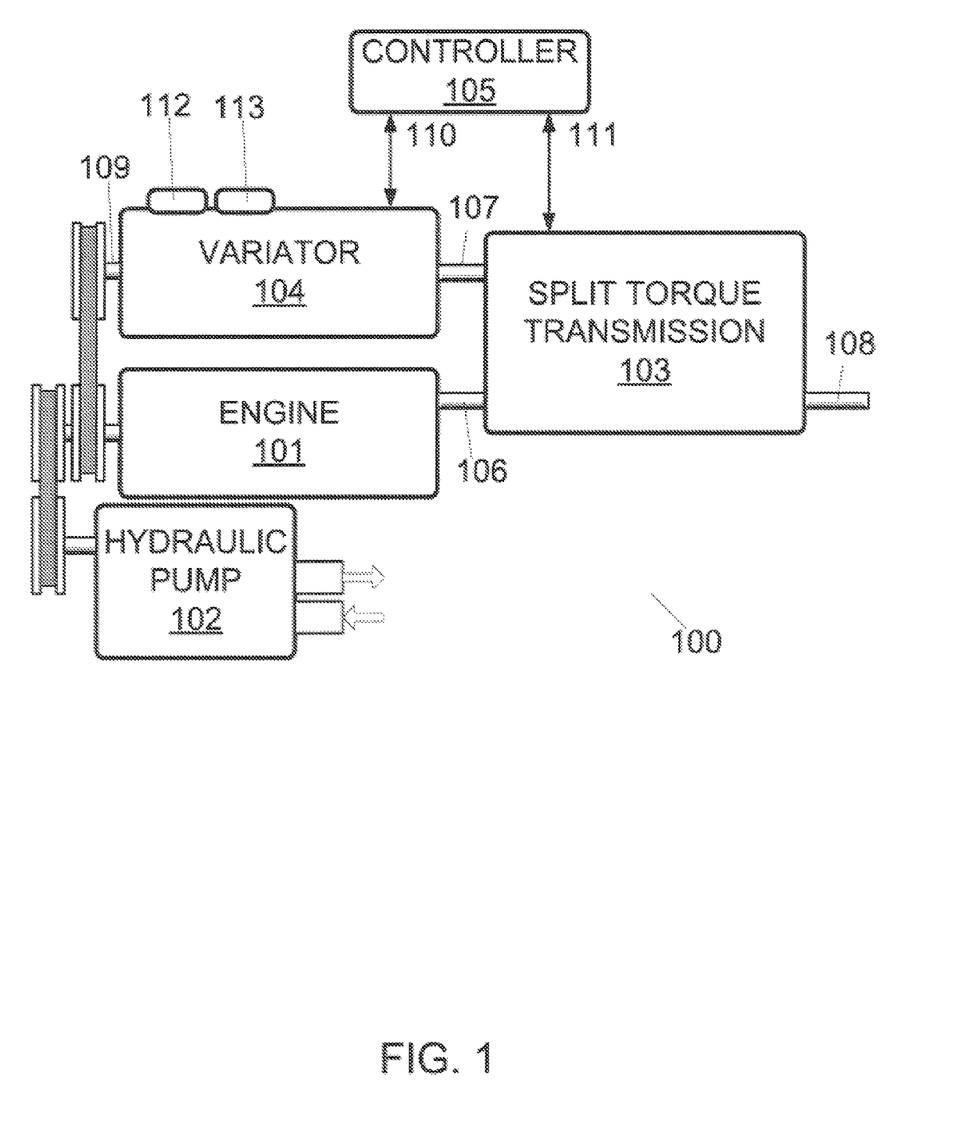
FIG. 1 is a schematic diagram of a transmission system for implementing an anti-hunt method according to described examples, including a shift controller.

FIG. 1 is a schematic diagram of a split torque transmission system 100 employing a variator drive element usable in conjunction with examples described herein. The transmission system 100 comprises a number of primary elements including a power source such as an engine 101, a variator 104, and a transmission 103. The engine 101 and variator 104 are linked to the transmission 103 via respective input shafts 106 and 107. The engine 101 drives the variator 104 via input 109. The engine 101 also drives a hydraulic pump 102 that provides pressurized hydraulic fluid to a number of elements including the variator 104. The variator 104 includes a transmission input speed sensor 112 and a transmission output speed sensor 113.

Figure 2:
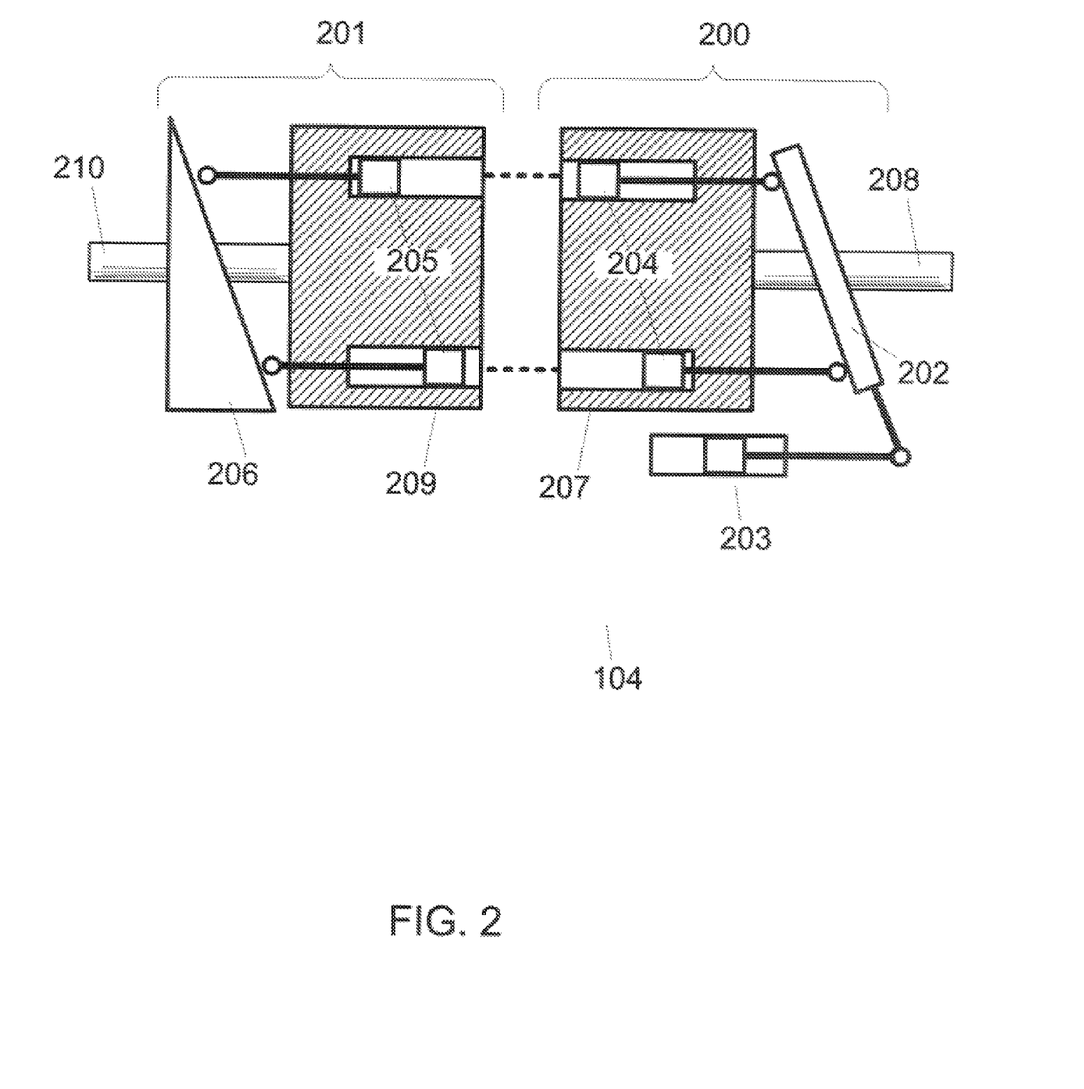
FIG. 2 is a detailed schematic drawing of a variator usable in conjunction with a transmission system such as that shown schematically in FIG. 1.

The torque and speed relationship between the variator input 109 and output 107 is controlled by controller 105, as will be briefly explained with reference to FIG. 2. FIG. 2 is a detailed schematic drawing of a variator 104 usable in conjunction with a transmission system such as that shown schematically in FIG. 1. Referring to FIG. 2, the variator 104 comprises a pump 200 and a motor 201. The pump 200 comprises a variable angle swash plate 202 set by a swash plate actuator 203. A number of pistons 204 in respective chambers ride on the swash plate via sliding contacts, such that the range of movement of the pistons is set by the angle of the swash plate 202. The chambers for the pistons 204 are formed in a pump carrier 207 that is rotated via the pump input shaft 208.

The motor 201 comprises a similar arrangement including a number of pistons 205 in respective chambers. The pistons 205 of the motor 201 are slidably engaged upon a fixed swash plate 206. The chambers of the pistons 204 of the pump 200 are in fluid communication with the chambers of the pistons 205 of the motor 201 via hydraulic fluid that fills the chambers and intervening conduits (not shown). The chambers for the pistons 205 are formed in a motor carrier 209 that rotates the motor output shaft 210. As the angle of the swash plate 202 is varied, the amount of fluid displaced by the pistons 204 of the motor 200 (and thus the fluid volume received or taken from the chambers of the pistons 205) varies.

Because of these interrelationships, the torque and/or output speed of the motor 201 varies in an essentially proportional manner with respect to the angle of swash plate 202. The swash plate actuator 203, which in this example operates on differential hydraulic pressure, is driven via solenoid valves (not shown), e.g., one for each of two pressure values, controlled electronically by the controller 105. In this way, the controller 105 controls the output speed (and/or torque) of the variator 104 via the application of electrical signals to solenoid valves associated with the swash plate actuator 203.

Referring again to FIG. 1, the controller 105 includes at least one electronic sensor input 110 to receive transmission data needed for determining when to shift, e.g., a transmission input speed signal, and a transmission output speed signal. The controller 105 further includes at least one electronic range output 111 to control the range of the transmission, e.g., by controlling a clutch solenoid or otherwise. The controller 105 is actuated via an included processor adapted to execute the steps and calculations described herein. The controller, through the processor may operate by executing computer-executable code, i.e., instructions, stored on a computer-readable medium such as ROM, RAM, flash, and other types of media, whether optical, magnetic, or electronic.

The transmission 103 provides output power at output shaft 108 to drive a load. As will be appreciated by those of skill in the art, the rotational speed, e.g., RPM, of the output shaft 107 is a function of a number of factors including the speeds and directions of the input shafts 106, 107, as well as a current range setting of the transmission 103. Thus, for a given selected range, the speed of the output shaft 108 will vary from a minimum speed for that range to a maximum speed for that range. The transmission range is changed selectively in order to achieve higher or lower output speeds than those allowed by a present range.

In transmissions of this type, range changes are synchronous, meaning that at the instant of a range change, no internal or external rotational elements change speed. However, after the range change, the relationship between the speeds and directions of the input shafts 106 and the speed of the output shaft 107 will be different for all values of these parameters except those at the shift point, sometimes referred to as the synchronous point. In addition, the torque of the variator 104 changes sign at the shift points.

Figure 3:
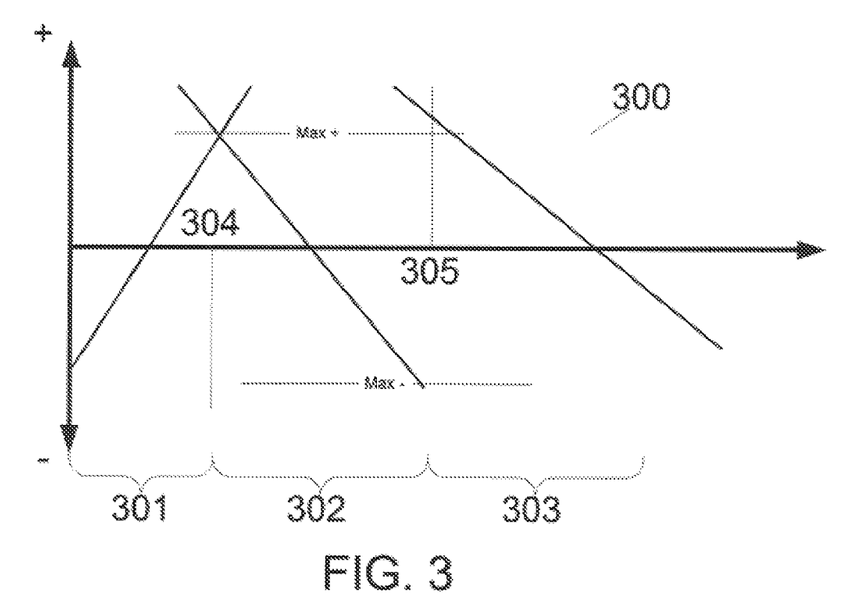
FIG. 3 is a simplified output ratio plot or speed chart for a parallel path variable (PPV) transmission.

This functionality will be better understood with reference to FIG. 3. FIG. 3 is a simplified output ratio plot 300 (also known as a speed chart) for a parallel path variable (PPV) transmission. The output ratio plot 300 relates the transmission output shaft ratio (e.g., ratio of speeds of shafts 107 and 108) to the variator pump displacement or motor ratio across different transmission ranges. Each transmission range enables a specific range 301, 302, 303 of output speeds. At each shift point 304, 305, the output speed curves of adjacent ranges overlap along the horizontal dimension. It will be appreciated that in the illustrated example, the shift between ranges 301 and 302 is synchronous while the shift between ranges 302 and 303 is not synchronous. Thus, for example, at shift point 304, the engine speed, variator speed, and output speed are the same whether range 301 or 302 is selected. Thus, it is only at that point 304 that a shift between ranges 301 and 302 can be smoothly made.

Figure 4:
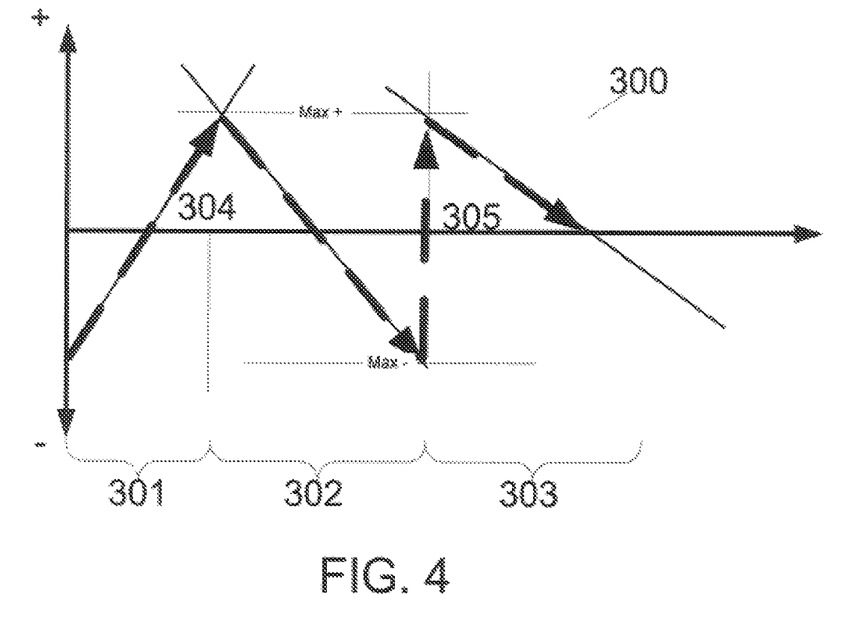
FIG. 4 is a simplified output ratio plot or speed chart for a PPV transmission with a variator speed progression curve overlaid on the transmission characteristic curves.

The idealized shifting behavior for a PPV transmission is illustrated in FIG. 4, which is a plot similar to that of FIG. 3, with an additional idealized variator speed progression curve (shown as a dashed line in FIG. 4) overlaid on the transmission characteristic curves. As can be seen from FIG. 4, starting at zero output speed, the actual variator speed is negative in this example. As the variator speed increases in the positive direction, the transmission output speed increases. As shift point 304 is reached, the transmission range shifts and the variator speed begins to decrease toward zero. At this time, the output speed continues to increase. In the middle of range 302, the variator speed crosses zero and begins to increase in the negative direction. During this time, the output speed also continues to increase. As shift point 305 is reached, the transmission range shifts and the variator speed goes to a value near its positive maximum and then decreases toward zero as the output speed continues to increase.

Figure 5:
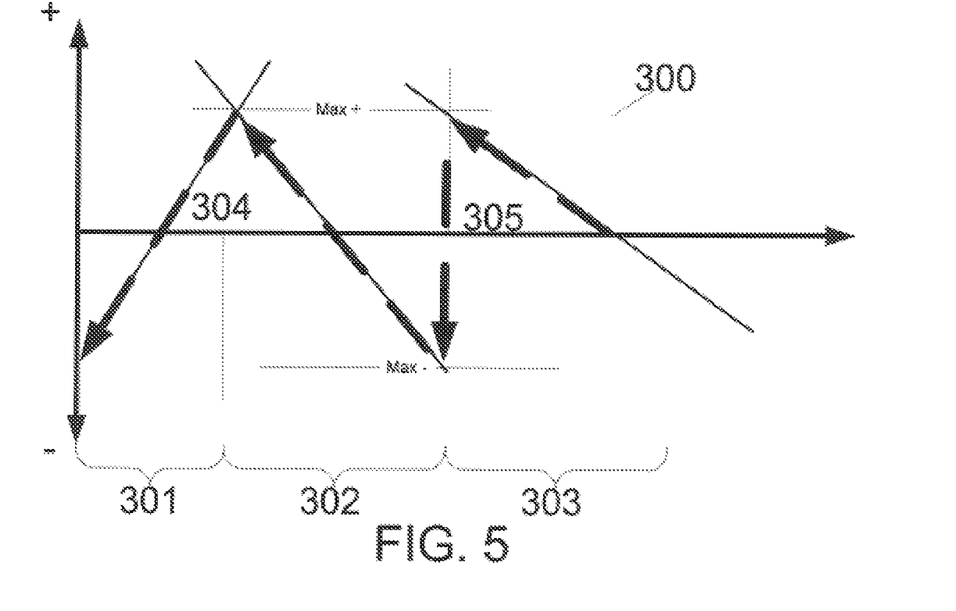
FIG. 5 is a further simplified output ratio plot or speed chart for a PPV transmission with a variator speed progression curve overlaid on the transmission characteristic curves.

The idealized downshifting behavior shown in FIG. 5 is simply the reverse of the idealized up-shifting behavior, as shown by the direction of the arrow in the dashed line representing the ideal variator progression curve. In particular, as the variator speed varies smoothly between its positive and negative limits, range changes are made at shift points and the output speed decreases smoothly to zero.

Figure 6:
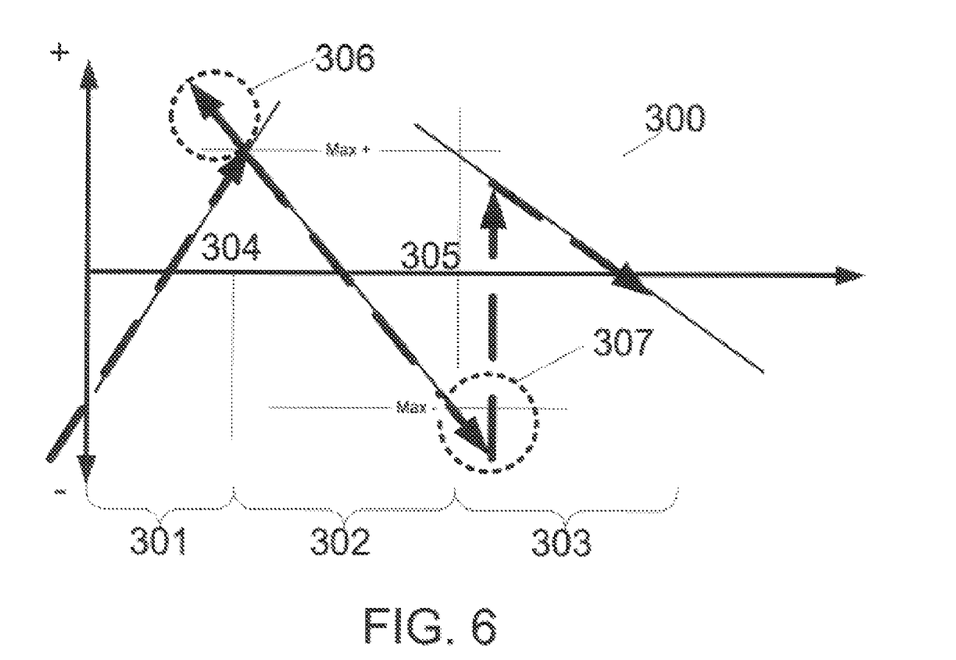
FIG. 6 is a simplified characteristic output ratio plot or speed chart as in FIG. 3, overlaid with non-ideal variator speed excursions near shift points.

FIG. 6 is the simplified characteristic output ratio plot 300 of FIG. 3, overlaid with non-ideal variator speed excursions near the first shift point 304 and second shift point 305 to illustrate the problem of drive train oscillation or "hunting." In this example, as the variator speed increases in the positive direction in range 301, the output speed rises. When the output speed reaches shift point 304, a shift is automatically executed, placing the system on the characteristic curve of range 302. However, subsequent to the shift, the output speed is reduced or "pulled down," such as by a sudden increase in load. This could happen, for example, when a grader strikes a large stone or a mound of earth, or when a drill bit encounters a layer of rock or other hard material.

As a result of the increased load and slowed output speed, the transmission is pushed back along the curve of range 302 toward a lower output speed as shown by path segment 306. This may drive the variator speed past its positive limit (max+) if a shift is prevented by the controller. Alternatively, an allowed shift may cause a drive train shock due to a step change in gear ratio under these conditions. The same type of situation can occur for sudden decreases in load just after a downshift.

Another type of irregular and potentially harmful behavior near shift points is shown in the region 307 of the plot 300 of FIG. 6. This occurs when an up-shift is executed after the shift point. Such a shift results in inefficiencies due to over-speed or under-speed of the engine and/or destroking (i.e., displacement change) within the variator.

Consequently, within transmission systems such as split torque transmissions that have distinct shift points, it is generally desirable to shift at an appropriate shift point, and to avoid excessive hunting or oscillation in the drive train when subsequent loading or unloading occurs. To that end, in one example, a timer is used in conjunction with a system of controls based on the trend and actual value of the ratio of the output speed to the input speed, as well as controls based on the indicated desired output speed and the variator output direction of rotation. In addition, in certain examples the transmission may be locked in a particular range or ratio.

Figure 7:
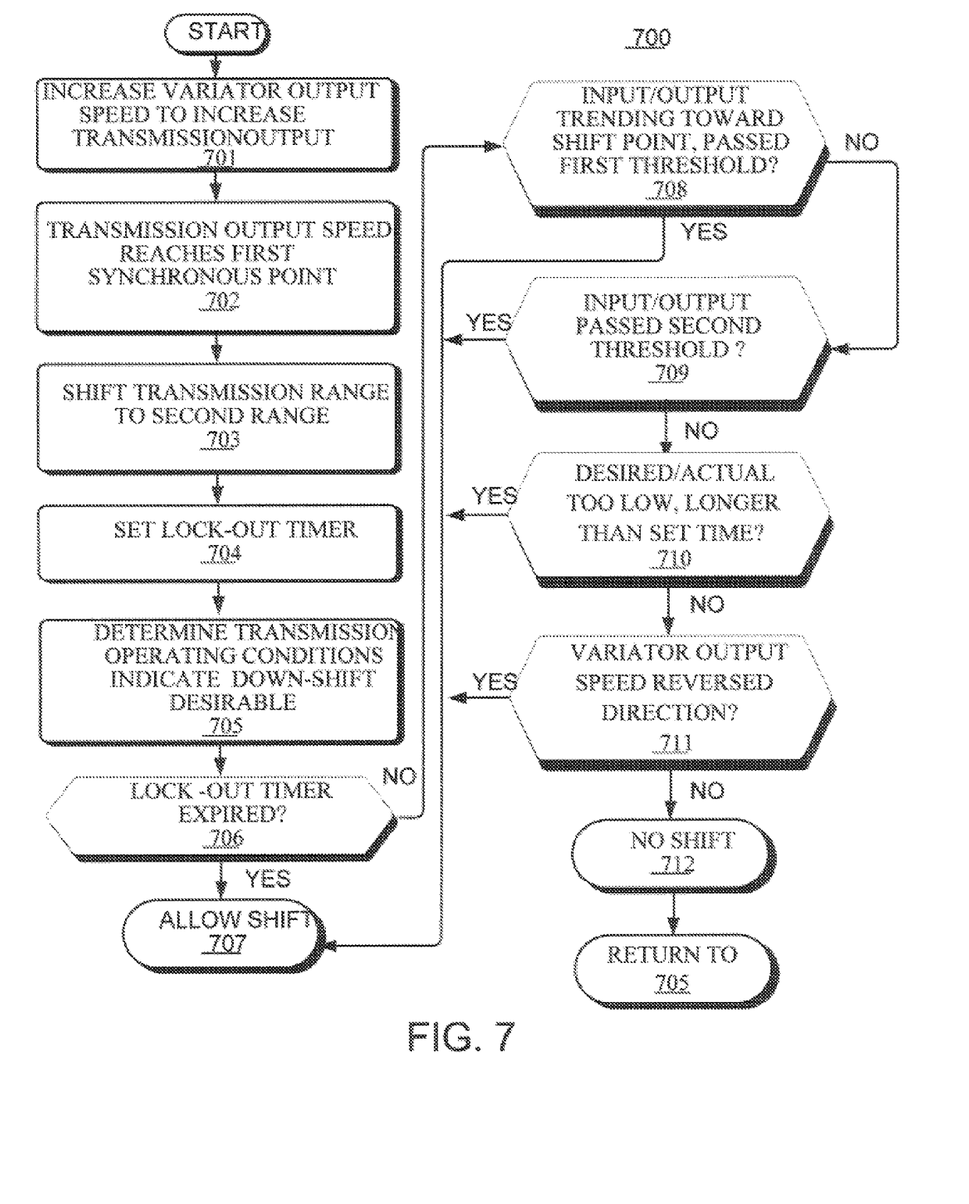
FIG. 7 is a flow chart illustrating a process for controlling hunting behavior in a transmission such as that of FIG. 1.
Figure 8:
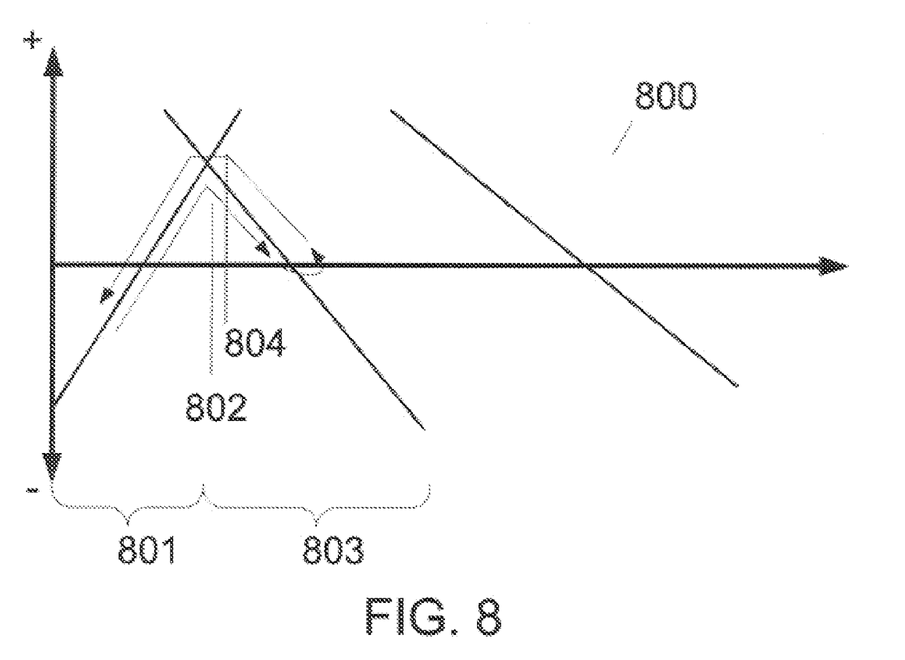
FIG. 8 is a simplified characteristic output ratio plot or speed chart overlaid with shift paths according to a process for preventing drive train oscillation.
Figure 9:
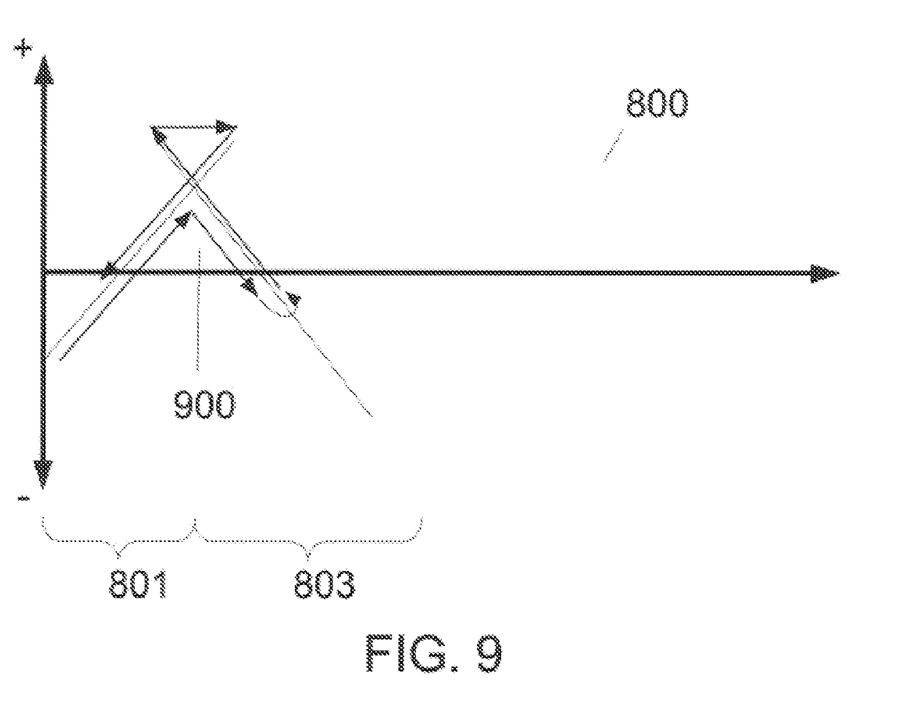
FIG. 9 is a simplified characteristic output ratio plot or speed chart overlaid with shift paths according to a further process for preventing drive train oscillation.

These and other exemplary techniques are discussed by way of the flow chart of FIG. 7, in conjunction with the output speed plots of FIGS. 8 and 9. However, it will be appreciated that different implementations will employ all or only a subset of the described controls and techniques. Although the flow chart of FIG. 7 as well as the plots of FIGS. 8 and 9 assume a transmission system such as that described above, it will be appreciated that the described techniques are applicable with respect to a number of other transmission systems.

At stage 701 of flow chart 700, the transmission is in a first range, shown as range 801 in FIG. 8. The transmission controller actuates the variator swash plate to positively increase the variator output speed, thus increasing the speed of the transmission output. At stage 702, the transmission output speed reaches a first synchronous point 802. Thus, at stage 703, the controller causes the transmission range to shift such that the plot of transmission output speed as a function of variator output shifts to the curve of range 803.

After the shift, the controller sets a lock-out timer in stage 704. Subsequent to the shift and the setting of the lock-out timer, the transmission operating conditions indicate that a down-shift is desirable at stage 705.

At stage 706, the controller determines whether the lock-out timer has expired. If it is determined that the lock-out timer has expired, then the process flows to stage 707, and the shift is allowed. Otherwise the process flows to stage 708. At stage 708, the controller determines whether the ratio of the variator output speed to the transmission output speed is trending toward a predefined shift point, such as, for example, the one just executed, and has returned past a predetermined first threshold, e.g., threshold 804. As noted above, a trend back toward the shift point may occur for a number of reasons, e.g., sudden increase in load, etc. A trend may be detected by taking a predetermined number of samples (e.g., 10 samples) of the ratio and detecting a monotonic progression of such samples toward the predefined shift point.

If it is determined at stage 708 that the ratio of the transmission output speed to engine speed is trending toward a predefined shift point and has passed the first threshold, the process flows to stage 707 and allows a shift. Otherwise, the process flows to stage 709. At stage 709, the controller determines whether the ratio of transmission output speed to engine speed has passed a second predetermined threshold beyond the shift point, e.g., threshold 900. If it is determined at stage 709 that the ratio of transmission output speed to engine speed has passed the second predetermined threshold, the process flows to stage 707 and allows a shift.

Otherwise, the process flows to stage 710. At stage 710, the controller determines whether the ratio of the desired output speed to the actual output speed is less than or greater than one for longer than a predetermined time, e.g., 4 seconds. If it is determined at stage 710 that the ratio of the desired output speed to the actual output speed is less than or greater than one for longer than the predetermined time, the process flows to stage 707 and allows a shift.

Otherwise, the process flows to stage 711. At stage 711, the controller determines whether the variator output speed has reversed direction since the shift. If it is determined at stage 711 that the variator output speed has reversed direction, the process flows to stage 707 and allows a shift. Otherwise, the process flows to stage 712, and a shift is not allowed.

In addition to the techniques described by reference to FIGS. 7-9, additional techniques may be used to ensure that the transmission does not oscillate during certain conditions, e.g., while climbing a grade. In one example, prior to allowing a shift at stage 707 of process 700, the controller executes an additional oscillation prevention process 1000 illustrated via the flow chart of FIG. 10. A stage 1001, the controller determines whether the transmission has been shifted between the first and second ranges more than a predetermined number x of times (e.g., twice) in a predetermined period (an evaluation period) y (e.g., 2 seconds). If it is determined that the transmission has been shifted between the first and second ranges more than x times in y seconds, then the process flows to stage 1002, wherein the controller locks the transmission in the lower of the two ranges.

Figure 10:
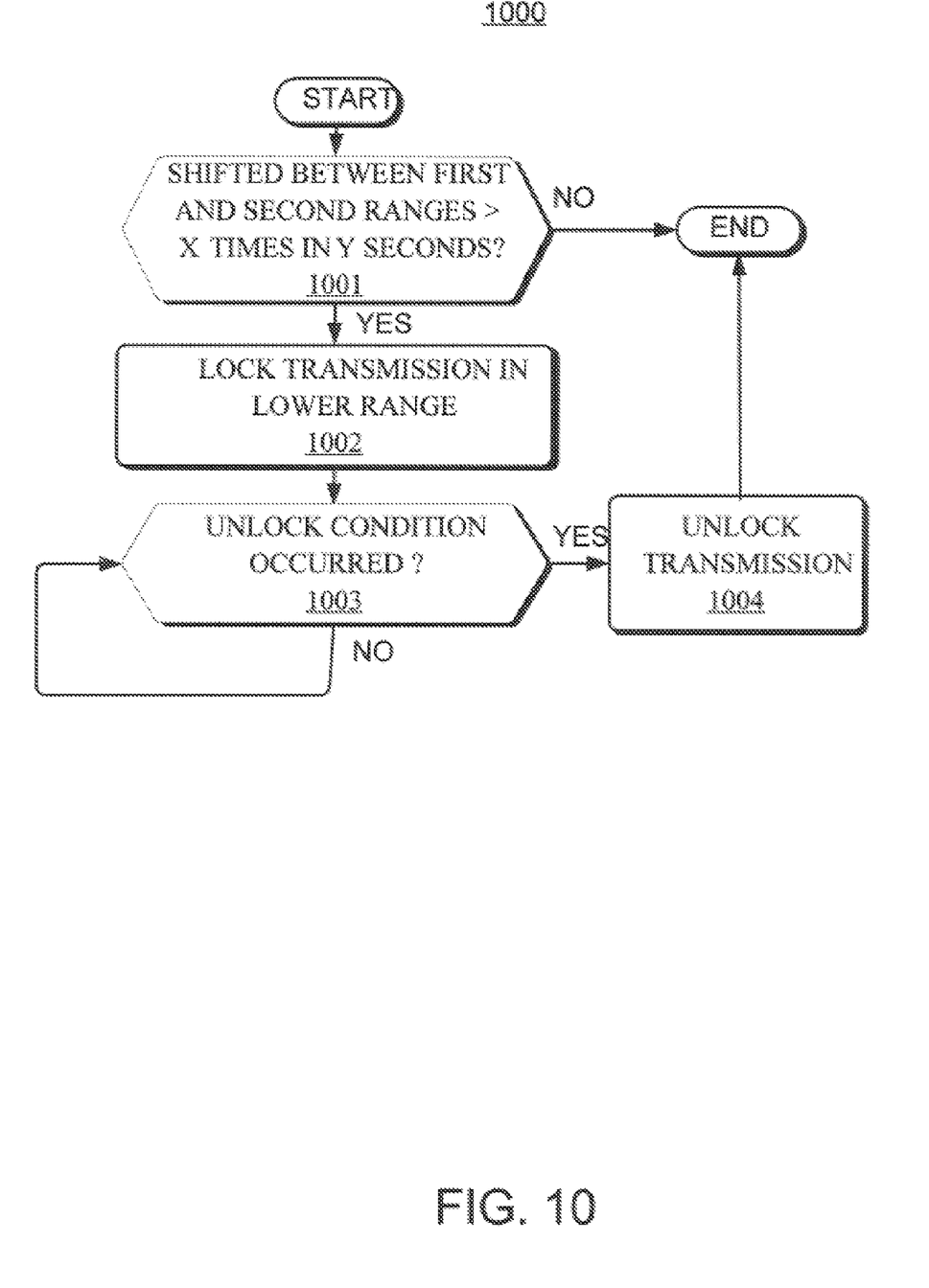
FIG. 10 is a flow chart illustrating an additional process for controlling hunting behavior in a transmission such as that of FIG. 1.

At stage 1003, the controller determines whether one or more exit conditions have occurred. An example of an exit condition is the engine speed exceeding a predetermined threshold value $E_{max}$. The accelerator/decelerator position (operator speed control position), forward/reverse selector position (operator direction selector position), variator output torque, and other values and parameters are also usable to provide exit conditions. If it is determined that one or more exit conditions have occurred (e.g., the desired direction of travel has changed), the process flows to stage 1004, and the controller unlocks the transmission. Otherwise, the process continues to await the occurrence of an exit condition at stage 1003.

In an embodiment, the type of each shift is considered in process decisions along with the number of shifts. In this embodiment, each anti-hunt exit type (i.e., an exit from the lock-out condition and allowance of a shift) has a flag associated with it, so that, for example, an exit due to a trend may have a flag of 3 associated with it and the threshold condition exit may have a flag of 2 associated with it. In this embodiment, the process determines how many of each flag has occurred, and if more than a threshold number has occurred in a predetermined amount of time then the system is "locked," i.e., further shifts are prevented. In this embodiment, it is possible that not all types of exits will be counted. For example, if the operator is oscillating their foot about and below the current output ratio, the transmission controller may try to achieve the operator-indicated operation. In an embodiment, the same is true with respect to the timer. In other words, if the operator's indicated shift commands are themselves oscillating, then the controller preferably tries to implement the indicated operations.

In a further embodiment, the lock-out timer is actually disabled when the actual transmission ratio and/or the operator desired transmission ratio is within some small window, e.g. plus or minus 2%, of the ratio at the synchronous point. This assists in avoidance of anti-hunt steps being taken when the output ratio experiences normal minor oscillations just after a shift due to the mechanical disturbances caused by the shift itself.

INDUSTRIAL APPLICABILITY

The industrial applicability of the transmission oscillation control system described herein will be readily appreciated from the foregoing discussion. A technique is described wherein the shifting of a split torque transmission is controlled to at least partially avoid drive train oscillation. As the split torque transmission shifts between adjacent operating ranges at synchronous points, a lock-out timer is set to prevent a subsequent shift of the transmission until the timer has expired. However, to avoid damage, irregular operation, etc. due to over-speed or under-speed of various drive train components, the described technique allows the lock-out timer to be overridden under certain conditions. For example, if the output ratio is trending back toward the synchronous point after a shift and continues to do so past a predetermined threshold value, the transmission controller will override the lock-out timer and allow a shift. Thus, although the present technique may not necessarily cause a shift, it can allow and disallow shifts that may otherwise have occurred under certain circumstances.

the present disclosure is applicable to transmissions having synchronous points for shifting, e.g., PPV transmissions or split torque transmissions, such as may be used in heavy industrial machines. For example, graders and other heavy industrial machines may benefit from application of the teachings herein. In such machines, application of the foregoing teachings can provide improved user experience as well as improved drive train longevity. The described system allows the operator of such a machine to use the machine under a wide variety of operating conditions without experiencing excessive drive train oscillation. Thus, for example, a grader may be operated over rough and/or inconsistent terrain, causing variable loading of the machine's propulsion system, without causing drive train oscillation when high loading occurs. Similarly, a heavy industrial machine may be operated on an incline and may shift without inducing drive train oscillation. At the same time, when a second shift is truly needed shortly after a first shift, the described system allows such shifts to occur.

It will be appreciated that the foregoing description provides examples of the disclosed system and technique. However, it is contemplated that other implementations of the disclosure may differ in detail from the foregoing examples. All references to examples herein are intended to reference the particular example being discussed at that point and are not intended to imply any limitation as to the scope of the disclosure or its implementation more generally. All language of distinction and disparagement in this disclosure with respect to certain features is intended to indicate a lack of preference for those features, but not to exclude such from the scope of the claims entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, modifications and equivalents of the subject matter described herein and recited in the claims appended hereto are contemplated, as permitted by applicable law. Moreover, any combination of the above-described elements in all possible variations thereof is encompassed unless otherwise indicated herein or otherwise clearly contradicted by context.

We claim:

1. A method of controlling a split torque transmission having a variator input and an output to at least partially avoid drive train oscillation, the split torque transmission having a plurality of contiguous selectable operating ranges, one or more pairs of adjacent operating ranges being separated by respective synchronous points, the method comprising:

operating the transmission within a first operating range;

detecting that a transmission ratio defined as the transmission output speed divided by the transmission input speed has reached a value coinciding with a first synchronous point lying between the first operating range and a second operating range;

causing the transmission to shift from the first operating range to the second operating range substantially at the first synchronous point;

setting a lock-out timer to prevent a subsequent shift until the timer has expired;

determining whether the transmission ratio is trending back toward the first synchronous point after setting the lock-out timer; and overriding the lock-out timer to allow a subsequent shift prior to expiration of the timer if the transmission ratio is trending back toward the first synchronous point and has passed a predetermined threshold value.

2. The method according to claim 1, wherein the transmission ratio is periodically sampled and the transmission ratio is deemed to trend back toward the first synchronous point when the transmission ratio moves toward the first synchronous point for each of a predetermined number of contiguous samples.

3. The method according to claim 1, further including:
determining whether the transmission ratio has reached a second predetermined threshold value lying in the first operating range while the transmission is operating in the second range; and
overriding the lock-out timer to allow a subsequent shift prior to expiration of the timer if the transmission ratio has reached the second predetermined threshold value.

4. The method according to claim 1, further including:
detecting at least one of a desired output speed and a desired transmission ratio based on input received from an operator at an operator interface;
determining whether a ratio of the desired output speed to an actual output speed differs from unity for longer than a predetermined time period; and
overriding the lock-out timer to allow a subsequent shift prior to expiration of the timer if the ratio of the desired output speed to the actual output speed differs from unity for longer than the predetermined time period.

5. The method according to claim 1, further including:
determining whether the variator output speed has reversed direction after the setting of the lock-out timer but prior to the expiration of the timer; and
overriding the lock-out timer to allow a subsequent shift prior to expiration of the timer if the variator output speed has reversed direction after the setting of the lock-out timer and prior to the expiration of the timer.

6. The method according to claim 1, further including:
determining a number of qualified shifts between the first range and the second range during an evaluation period, wherein a qualified shift is one that meets a predetermined criterion; and
locking the transmission in the lower of the first and second ranges if the number of qualified shifts between the first range and the second range during the evaluation period exceeds a predetermined limit value.

7. The method according to claim 6, further including:
unlocking the transmission from the lower range if it is determined that a predetermined unlock condition has occurred.

8. The method according to claim 7, wherein the unlock condition is based on a parameter selected from the group consisting of engine speed, operator speed control position, operator direction selector position, desired variator output torque, and actual variator output torque.

9. A transmission controller for controlling a split torque transmission having a variator input and an output to reduce drive train oscillation, the split torque transmission having a plurality of operating ranges separated by defined shift points, the controller comprising:
at least one electronic sensor input to receive transmission data including a transmission input speed signal and a transmission output speed signal;
at least one electronic range output to control the range of the transmission; and
a processor configured to perform the functions of shifting the range of the transmission via the range output substantially at a first defined shift point lying between a first operating range and a second operating range, setting a lock-out timer to prevent a subsequent shift until the timer has expired, and overriding the lock-out timer to allow a subsequent shift prior to expiration of the timer if the transmission operation trends back toward the first defined shift point and passes a predetermined threshold value.

10. The transmission controller according to claim 9, wherein the at least one electronic sensor input is further configured to perform the functions of receiving an operator input signal indicative of one of a desired transmission output speed and a desired transmission output ratio.

11. The transmission controller according to claim 9, wherein the transmission input speed signal and the transmission output speed signal are sampled periodically and the transmission operation is deemed to trend back toward the first defined shift point when the transmission output speed signal moves toward the first defined shift point for each of a predetermined number of contiguous samples.

12. The transmission controller according to claim 9, wherein the processor is further configured to perform the functions of overriding the lock-out timer to allow a subsequent shift prior to expiration of the timer if the output ratio has reached a second predetermined threshold value lying in the first operating range.

13. The transmission controller according to claim 9, wherein the processor is further configured to perform the functions of detecting a desired output speed based on input received from an operator at an operator interface and overriding the lock-out timer to allow a subsequent shift prior to expiration of the timer if a ratio of one of the desired output speed and the desired output ratio to one of an actual output speed and an actual output ratio differs from one for longer than a predetermined time period.

14. The transmission controller according to claim 9, wherein the processor is further adapted to override configured to perform the functions of overriding the lock-out timer to allow a subsequent shift prior to expiration of the timer if the variator output speed has reversed direction after the setting of the lock-out timer and prior to the expiration of the timer.

15. The transmission controller according to claim 9, wherein the processor is further configured to perform the functions of determining a number of shifts between the first range and the second range during an evaluation period, and locking the transmission in the lower of the first and second ranges if the number of shifts between the first range and the second range during the evaluation period exceeds a predetermined limit value.

16. The transmission controller according to claim 15, wherein the processor is further configured to perform the functions of unlocking the transmission from the lower range if it is determined that an unlock condition has occurred.

17. The transmission controller according to claim 16, wherein the unlock condition is based on a parameter selected from the group consisting of engine speed, operator speed control position, operator direction selector position, desired variator output torque, and actual variator output torque.

18. A computer-readable medium having thereon computer-executable code for executing a method of controlling a split torque transmission having a variator input and an output to reduce drive train oscillation, the split torque transmission having at least two contiguous selectable operating ranges being separated by a synchronous point, each range being defined by a respective transmission ratio, the computer-executable code comprising instructions for:
operating the transmission within a first operating range;

causing the transmission to shift from the first operating range to a second operating range substantially at the synchronous point;

setting a lock-out timer to prevent a subsequent shift until the timer has expired; and overriding the lock-out timer to allow a subsequent shift if the transmission input speed monotonically approaches the first synchronous point for a predetermined period of time after the lock-out timer is set and has passed a predetermined threshold value.

19. The computer-readable medium according to claim 18, further comprising instructions for overriding the lock-out timer to allow a subsequent shift if the transmission input speed reaches a second predetermined threshold value.

20. The computer-readable medium according to claim 18, further comprising instructions for:
- determining a number of shifts between the first range and the second range during an evaluation period;
- locking the transmission in the lower of the first and second ranges if the number of shifts between the first range and the second range during the evaluation period exceeds a predetermined limit value; and
- unlocking the transmission from the lower range if it is determined that an unlock condition has occurred.

* * * * *